June 14, 1960
S. RUBINSTEIN
2,940,792
PARACHUTE LOAD RELEASE
Filed Oct. 21, 1957
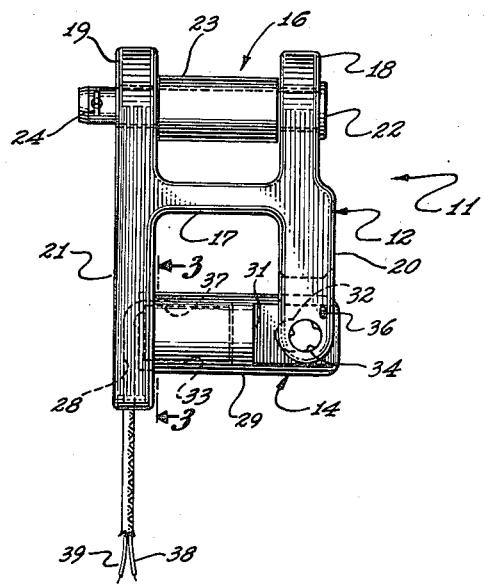
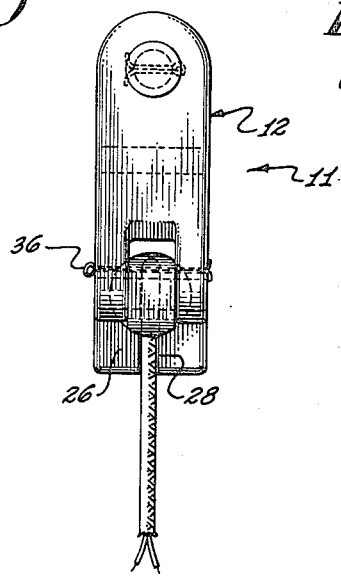
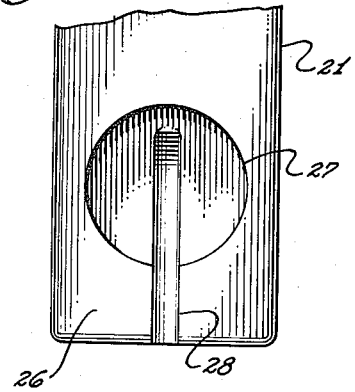
INVENTOR.
Stanley Rubinstein
His Patent Attorney

United States Patent Office 2,940,792
Patented June 14, 1960

2,940,792
PARACHUTE LOAD RELEASE

Stanley Rubinstein, San Fernando, Calif., assignor to Northrop Corporation, Hawthorne, Calif., a corporation of California Filed Oct. 21, 1957, Ser. No. 691,357

2 Claims. (Cl. 294—83)

This invention relates to a coupling and release mechanism and more particularly to a parachute load release mechanism or the like which is actuated by an explosive charge.

The coupling and release mechanism as disclosed herein is extremely simple and efficient in operation. The mechanism consists of a support structure having a single moving part mounted thereon. One end of the moving part is pivotally attached to the structure and carries an explosive charge at its other end. The part is maintained in a locked position on the support structure by means of a positioning pin or the like. Upon the firing of the explosive charge the resulting gases as they expand simultaneously shears the positioning pin and urges the part to a position in which it is free to rotate about its pivoted end. The part now rotates to a release position in which gear originally supported thereby is free to fall away from the support structure and part.

An object of the present invention is to provide a coupling and release mechanism which provides a quick and positive action during the release phase of its operation.

Another object is to provide a coupling and release mechanism which is actuated by the firing of an explosive charge which is fired in a conventional manner.

Another object is to provide a coupling and release mechanism which is simple in design yet rugged and durable in construction, which is extremely free of malfunctioning tendencies, which is economical to manufacture, and which may be easily adapted to any purpose for which it is intended.

Although the characteristic features of the present invention are particularly pointed out in the appended claims, the invention itself, also the manner in which it may be carried out, will be better understood by referring to the following description taken in connection with the accompanying drawing forming a part of this application and in which:

Figures 1 and 2 are front and side elevational views, respectively, of the coupling and release mechanism as disclosed herein.

Figure 3 is a fragmentary detail view of the coupling and release mechanism of Figures 1 and 2 and is viewed as indicated by the arrows 3—3 of Figure 1, certain parts being omitted for purposes of clarity.

Referring to the drawing, the coupling and release mechanism as disclosed herein and as shown in Figures 1 and 2 is identified generally by the numeral 11. The mechanism 11 consists of a support structure 12 and primary and secondary release members 14 and 16, respectively.

The support structure 12 is of integral construction and is substantially H-shaped as viewed in Figure 1. It consists of a cross portion 17 and legs 18–21, inclusive. The legs extend from the cross portion 17 and lie substantially in a common plane. The legs 18 and 19 are of identical construction and have aligned circular apertures formed at their outer ends.

The secondary release member 16 includes a pin 22 which is mounted in the apertures in the legs 18 and 19. The pin 22 carries a loose fitting collar 23 which substantially spans the distance between the legs. The pin 22 is maintained in its relative position with respect to the legs 18 and 19, substantially as shown in Figure 1, by means of a cotter pin 24.

The outer end of the leg 20 is bifurcated and the bifurcated ends have axially aligned apertures formed therein. The leg 21 is slightly longer than the leg 20 and has a generally plane surface 26 facing the leg 20. A shallow cylindrical cavity or socket 27, closed at its inner end and opens on the surface 26, is formed at the outer end of the leg 21. The axis of the socket 27 and the axes of the apertures formed in the bifurcated ends of the arm 20 lie in the same horizontal plane as viewed in Figure 1. A slot 28 is also provided in the outer end of the leg 21 and has a relative relation with respect to the cavity 27 as best seen in Figures 1 and 3.

The primary release member 14 constitutes a generally cylindrical member 29 except for one end 31 which is generally of rectangular configuration. The end 31 of the member 29 has an elongated aperture 32 formed therein which extends between and has a normal relation with the parallel faces of the end 31. Also the outside diameter of the cylindrical end of the member 29 is such that it has a snug sliding fit with the cylindrical wall of the socket 27. The cylindrical end of the member 29 also has a cylindrical cavity 33 formed therein which terminates at approximately the mid-portion of the member 29 and is open at its outer end. The axis of the cavity 33 coincides with the axis of the cylindrical end of the member 29.

In the assembled relation of the support structure 12 and member 29 the rectangular end 31 of the latter is inserted between the bifurcated ends of the leg 20 and is held therein by a pin 34 which passes through the aligned apertures in the leg 20 and the aperture 32 formed in the member 29. Also in the assembled relation of the structure 12 and member 29 the cylindrical end of the member 29 is received in the socket 27. This position of the member 29 as shown in Figure 1 is referred to as its locked position. The member 29 is normally maintained in this position by a shear pin 36 which extends through the member 29 and the bifurcated ends of the leg 20.

Before the member 29 is secured in its locked position an electroresponsive detonator 37 is positioned in the cavity 33. The detonator 37 is fired by an electrical current which flows through connectors 38 and 39 under predetermined conditions. It is understood that the connectors 38 and 39 are connected to a source of electrical current and switch means neither of which is shown. The detonator may be fired in response to any one of a number of conditions which results in the closing of a mechanical or inertial switch. It will also be apparent that the detonator 37 may be fired mechanically if desired.

Although the coupling and release mechanism 11 has many applications it is assumed in the present disclosure that it is utilized to couple and subsequently release a load from an air-borne parachute. In this instance the shroud lines of a parachute are attached to the secondary release member 16 in surrounding relation. The straps for supporting a load are next positioned around the member 29 and the detonator charge 37, carrying the connectors 38 and 39, is positioned in the cavity 33. The member 29 is then moved into its locked position as shown in Figure 1. The elongated slot 32 allows the member 29 to be moved toward and away from the leg 21 and thereby allows the member 29 to be positioned in its locked position. In its locked position the cylindrical end of the member is positioned in and bottomed in the socket 27 with the connectors 38 and 39 extending therefrom through the slot 28. The member 29 is now secured in its locked position by inserting the shear pin 36. It will now be apparent that the shroud lines (not shown) and load supporting straps (not shown) will be secured together by the mechanism 11 until such time as the detonator 37 is fired.

At such time as the detonator 37 is fired by any known method the expanding gases therefrom simultaneously force the member 29 from the socket 27 and the movement of the member 29 shears the pin 36. With the pin 36 sheared, and the cylindrical end of the member 29 forced from the socket 27, the member 29 is free to pivot about the pin 34. Accordingly the load supporting straps (not shown) are free to slide off the end of the member 29 and the load is thereby released from the parachute.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed:

1. A load coupling and release mechanism comprising: a support structure including a center portion and two pairs of legs having a parallel and aligned relation extending from said center portion; one pair of said pairs of legs including a leg the outer end of which is bifurcated; an elongated primary release member having an elongated aperture in one end; pin means extending through said bifurcated leg and elongated aperture allowing pivotal movement of said primary release member with respect to said bifurcated leg and linear movement thereof at such times as the primary release member has a normal relation with respect to said bifurcated leg; the outer end of the other leg of said one pair of said pairs of legs defining a socket; shear means in contact with said support structure and said primary member to normally maintain said primary member in a locked position in which the other end of said primary member is axially received in said socket to effectively close the latter; the other end of said primary release member defining an axially extending cavity; detonator means mounted in said cavity; connectors in contact with said detonator means whereby the latter may be fired and functioning to initially urge the primary release member in a direction normal to said one pair of legs and shearing said shear means whereby said primary release member is free to pivot about said pin means; and a secondary release member secured to and extending between the other pair of said pairs of legs.

2. In a load coupling and release mechanism the combination comprising: an H-shaped support structure including a center portion and at least one pair of spaced parallel legs extending from said center portion; the outer end of one leg of said pair of legs being bifurcated; a rod-like release member having an elongated transversely extending slot formed in one end thereof; pin means extending through said bifurcated leg and elongated slot normally allowing pivotal movement of said release member with respect to said bifurcated leg and linear movement thereof at such times as the release member has a normal relation with respect to said bifurcated leg; the outer end of the other leg of said one pair of legs defines a socket; shear means in contact with said support structure and said release means to normally maintain said release member in a locked position in which the other end of said release member is axially received in said socket to effectively close the latter; the other end of said release member having an axially extending cavity formed therein; detonator means mounted in said cavity; and connectors in contact with said detonator means whereby the latter may be fired to initially urge the release member in a direction normal to said one pair of legs thereby shearing said shear means and freeing said release member whereby the latter is free to pivot about said pin means.

References Cited in the file of this patent

UNITED STATES PATENTS

| | | |
|---|---|---|
| 518,131 | Beckeman | Apr. 10, 1894 |
| 2,405,333 | Sheridan | Aug. 6, 1942 |
| 2,485,921 | Rockwell | Oct. 25, 1949 |
| 2,664,610 | Hannemann | Jan. 5, 1954 |
| 2,732,765 | Boyd | Jan. 31, 1956 |
| 2,740,656 | Gaylord | Apr. 3, 1956 |